UNITED STATES PATENT OFFICE.

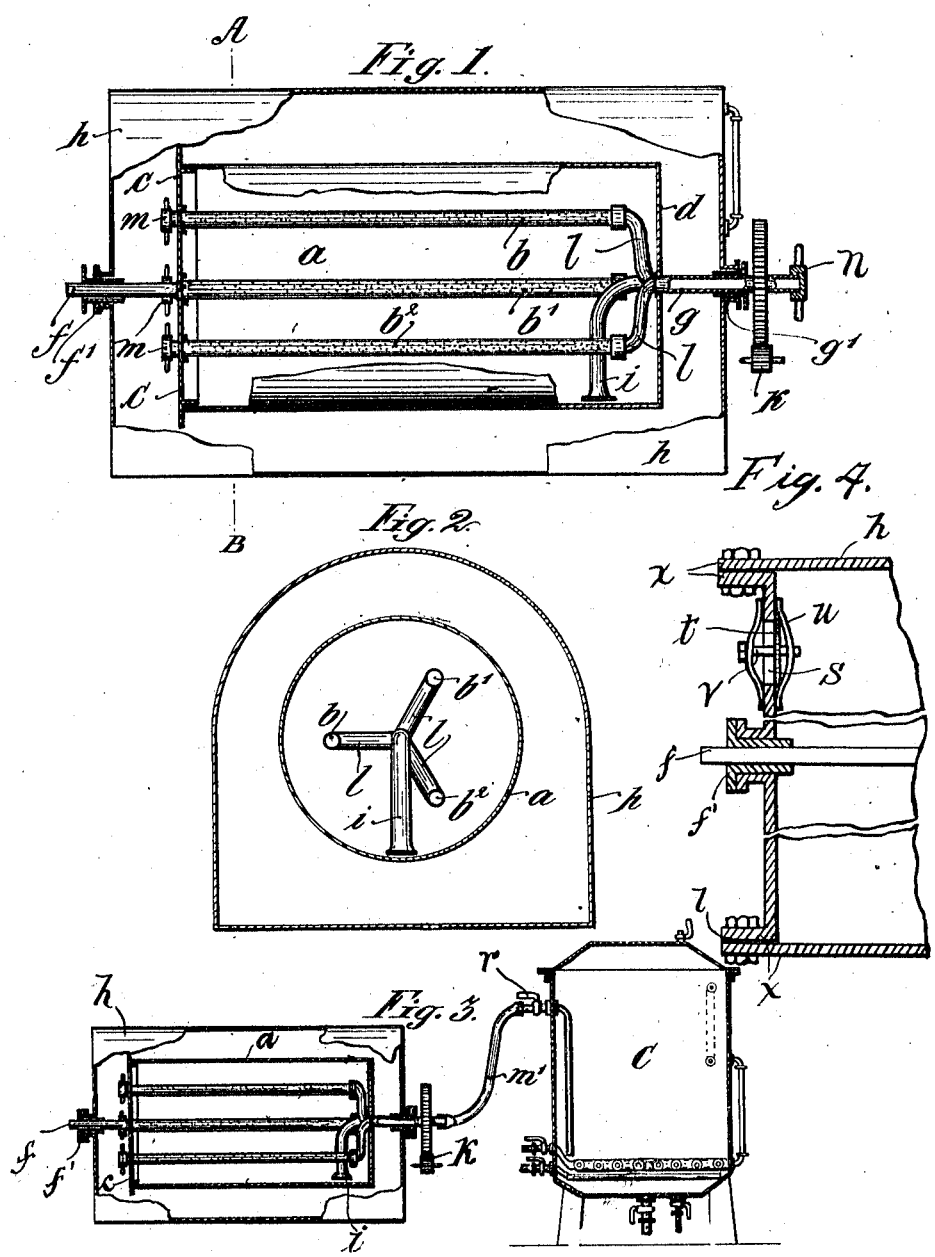

ARTHUR ROSENBERGER, OF BERLIN, GERMANY.

APPARATUS FOR PRODUCING KEFIR POWDER.

957,104.  Specification of Letters Patent.  Patented May 3, 1910.

Application filed June 29, 1908. Serial No. 440,993.

*To all whom it may concern:*

Be it known that I, ARTHUR ROSENBERGER, owner of a chemist's shop, a subject of the German Emperor, resident of Berlin, Germany, have invented certain new and useful Improvements in an Apparatus for Producing Kefir Powder, of which the following is a specification.

My invention relates to the producing of kefir in the form of powder, and more particularly to the apparatus used in such process.

The object of the invention is to provide an apparatus of this character wherein a product is obtained, which when mixed with milk as well as with water, will be ready for use.

The present invention solves this question in a simple and practical manner and at the same time an apparatus is produced which will be easy of operation, proving also to be cheap and economical to manufacture.

The apparatus serving to carry out the process is illustrated on the drawing, where—

Figure 1 shows a sectional front view of the apparatus. Fig. 2 is a vertical sectional view on the line A—B of Fig. 1. Fig. 3 a total view of the apparatus in connection with the vacuum-apparatus. Fig. 4 is an enlarged cross-sectional view, in part, of the outer casing, and having the valved opening therein.

Similar letters refer to similars parts throughout the several views.

In the cylindrical receptacle $a$, which may be made of any suitable material, are inserted any desired number of tubes $b$, $b^1$, $b^2$ provided with perforations. The tubes are fastened in the receptacle $a$ to the front-walls $c$ and $d$, said wall $c$ being detachably secured to the receptacle, while the wall $d$ is a part thereof and water can pass around them on all sides. At the wall $c$ the tubes $b$, $b^1$, $b^2$ are accessible, they project through this wall and can be closed on the outside by cocks or caps $m$; and a cap $n$, similar to the caps $m$ is also provided for closing the pipe $q$ when detached from the tube $m^1$. The tubes are in the interior of the receptacle $a$ so arranged on the walls $c$ and $d$ that they can be easily screwed off and removed for the purpose of being filled with kefir fungi and later on cleaned. This is accomplished by providing the wall of the casing $h$ adjacent the wall $c$ of the receptacle $a$ with an opening $s$ which can be closed by any suitable valve $t$ preferably having a bearing in journal brackets $u$ through the medium of a bolt or the like $v$ and the end wall of the casing may be secured by means of bolts $w$ passed through flanges $x$. The receptacle $a$ has further at the front-walls $c$ and $d$ the shafts $f$ and $g$ resting in the bearings $f^1$ and $g^1$ arranged in the casing $h$ which completely surrounds the receptacle $a$ and said shafts are anchored or otherwise fastened to the walls $c$ and $d$ respectively, so as to rotate in unison therewith. By means of a suitable driving-gear $k$ (toothed wheels or the like) the shafts $f$, $g$ and thereby also the receptacle $a$ can be slowly put into a rotating motion. The shafts $f$ and $g$ pass in the casing $h$ through stuffing-boxes by which the casing is made perfectly tight against the outside air.

The casing serves to receive warm water, air, or the like, which entirely surround the receptacle $a$. The water, or the like, is conveyed into or out of the casing by a suitable conduit of pipes. In order to fill the receptacle $a$ with the desired liquid, the cap $n$ is removed from the hollow shaft $g$ and connection may be made therewith, liquid flowing into the said receptacle through the angle-tube $i$ to remove the product which has been introduced into the receptacle $a$, the axle $g$ is hollow and communicates through the intermediate piece $l$ with the tubes $b$, $b^1$, $b^2$. An angle-tube $i$ at a small distance above the bottom wall of the receptacle $a$, with a funnel-shaped outlet-opening, likewise serves to remove the product, being connected with the hollow shaft $g$, or with the intermediate parts $l$. A suitable conduit of tubes $m^1$, which can be easily detached, leads to a vacuum-apparatus C of a system already known and has a valved connection $r$ therewith, as it is thought will be readily understood, is for the purpose of controlling the communication therewith (see Fig. 3).

The process of producing the kefir preparation by means of this apparatus is as follows: Before filling the receptacle $a$ with the milk, the kefir fungi are introduced into the tubes $b$, $b^1$, $b^2$. Into the receptacle is now poured the most suitable milk, for instance, aseptically won fresh milk, through the hollow axle $g$, by means of a funnel-shaped tube, whereupon the receptacle $a$ is heated to 30° C. by warm water, air, gas, or the like, and put into a slow rotating movement by the driving-gear $k$. In consequence of this continuous rotation the milk comes sufficiently into contact with the kefir fungi and hereby and the uniform temperature the growing of the fungi in the milk is especially favorably influenced, and there is thus obtained a kefir of an always uniform condition. After a certain time, the movement is stopped and the hollow axle $g$ is put into communication with the pipe $m^1$ leading to the vacuum, while the air is completely shut off. By means of the vacuum the contents of the receptacle $a$ are now entirely conveyed to the vacuum-receptacle C through the tubes $i$ and $m^1$ and the hollow shaft $g$ after the vacuum-receptacle C has previously been sterilized. In the vacuum the mass is now evaporated at 30° C. until it is dry, whereupon the product won is taken out of the vacuum and, after adding milk-sugar, it is pressed into tablets in the usual manner. The product thus obtained is a kefir-tablet which can, at any time, be used for the reproduction of kefir from milk.

What I claim as my invention and desire to secure by United States Letters Patent is:—

1. In an apparatus for producing kefir, the combination with a casing provided with end walls, one of said end walls having an opening therein, a rotatable valve for said opening, of shafts having bearings in said end walls, a receptacle rigidly mounted on said shafts, said receptacle being provided with a removable front wall, a series of perforated tubes extending longitudinally within said receptacle, said tubes having open ends adjacent one end wall of the casing, removable closures for said openings, one of the aforesaid shafts being hollow and having angular connections with the series of tubes, an angular tube leading from said connections, said tube having communication with the interior of the receptacle, and means connected with said hollow shaft for rotating same.

2. In an apparatus for producing kefir, the combination with a casing of a receptacle rotatably mounted within said casing, a series of perforated tubes within said receptacle, a vacuum apparatus in the form of an evaporator located adjacent said receptacle, and means for effecting communication between said vacuum apparatus and the interior of the receptacle.

3. In an apparatus for producing kefir, the combination with a casing, of a receptacle within said casing, shafts for said receptacle rotatably mounted in the walls of the casing, one of said shafts comprising a hollow tube having communication with the interior of the receptacle, a vacuum apparatus, said vacuum apparatus provided with suitable evaporating means having valved connection with the hollow shaft.

4. In an apparatus for producing kefir, the combination with a stationary casing, of a receptacle one of said end walls being provided with an opening, a valve for said opening whereby access may be had to the interior casing, a removable cover for the receptacle adjacent said end, a series of tubes rigidly carried within the receptacle, and means in geared connection with the receptacle for rotating the same.

In testimony whereof I have signed my name to this specification in the presence of two subscribing witnesses.

ARTHUR ROSENBERGER.

Witnesses:
  HENRY HASPER,
  WOLDEMAR HAUPT.